United States Patent
Resch et al.

(10) Patent No.: US 10,581,807 B2
(45) Date of Patent: Mar. 3, 2020

(54) USING DISPERSAL TECHNIQUES TO SECURELY STORE CRYPTOGRAPHIC RESOURCES AND RESPOND TO ATTACKS

(71) Applicant: International Business Machines Corporation, Armonk, NY (US)

(72) Inventors: Jason K. Resch, Chicago, IL (US); Mark D. Seaborn, Algonquin, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 134 days.

(21) Appl. No.: 15/249,726

(22) Filed: Aug. 29, 2016

(65) Prior Publication Data
US 2018/0063090 A1    Mar. 1, 2018

(51) Int. Cl.
*H04L 29/06* (2006.01)
*H04L 29/08* (2006.01)

(52) U.S. Cl.
CPC ........ *H04L 63/0428* (2013.01); *H04L 63/062* (2013.01); *H04L 67/1097* (2013.01)

(58) Field of Classification Search
CPC ............... H04L 63/0428; H04L 63/062; H04L 67/1097
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |

(Continued)

OTHER PUBLICATIONS

NPL Search (Google Scholar) (Year: 2019).*

(Continued)

*Primary Examiner* — Samson B Lemma
*Assistant Examiner* — Richard W Cruz-Franqui
(74) *Attorney, Agent, or Firm* — Garlick & Markison; Timothy W. Markison; Edward J. Marshall

(57) ABSTRACT

A dispersed storage network (DSN) includes a DSN memory, which in turn employs multiple distributed storage (DS) units to store encrypted secret material that can be decrypted using an unlock key. The unlock key is stored external to the DS unit, in some cases using multiple data slices dispersed throughout the DSN. To obtain the unlock key, the DS unit transmits authentication credentials to another device included in the DSN, but external to the DS unit. The other device authenticates the DS unit using the authentication credentials, and sends the unlock key to the DS unit. The DS unit uses the unlock key in normal decryption operations. In response to a security event, the DS unit transitions to a secure mode by erasing any material decrypted using the unlock key, the unlock key, and the DS unit's authentication credentials.

15 Claims, 6 Drawing Sheets

(56) References Cited

U.S. PATENT DOCUMENTS

| | | |
|---|---|---|
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,782,086 B2* | 7/2014 | Resch ............... G06F 11/1004 707/785 |
| 9,009,567 B2* | 4/2015 | Baptist ............... H04L 67/1097 709/215 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0004614 A1* | 1/2006 | Hutchinson ........ G06Q 10/0633 705/7.27 |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0143836 A1* | 6/2007 | Bowers ............... H04L 63/0807 726/10 |
| 2007/0174192 A1 | 7/2007 | Gladwin et al. |
| 2007/0180493 A1* | 8/2007 | Croft ..................... G06F 3/1415 726/2 |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2008/0098239 A1* | 4/2008 | Wada ............... G11B 20/00086 713/193 |
| 2009/0094251 A1 | 4/2009 | Gladwin et al. |
| 2009/0094318 A1 | 4/2009 | Gladwin et al. |
| 2009/0144827 A1* | 6/2009 | Peinado ................ G06F 21/577 726/25 |
| 2010/0023524 A1 | 1/2010 | Gladwin et al. |
| 2010/0281223 A1* | 11/2010 | Wolfe ................ G06F 12/0808 711/133 |
| 2011/0154060 A1* | 6/2011 | Guyot ................. G06F 12/1425 713/193 |
| 2011/0225209 A1* | 9/2011 | Volvovski ............. G06F 16/162 707/803 |
| 2012/0027134 A1* | 2/2012 | Gladwin ............... H04L 1/0045 375/340 |
| 2012/0054486 A1* | 3/2012 | Lakkavalli .............. G06F 21/57 713/156 |
| 2012/0117629 A1* | 5/2012 | Miyazawa .............. H04L 63/08 726/4 |
| 2013/0046973 A1* | 2/2013 | Resch ..................... H04L 9/085 713/156 |
| 2013/0074115 A1* | 3/2013 | Hyde ............... H04N 21/41422 725/30 |
| 2013/0246812 A1* | 9/2013 | Resch .................. G06F 21/6218 713/193 |
| 2013/0275776 A1* | 10/2013 | Baptist ............... H04L 67/1097 713/193 |
| 2013/0304711 A1* | 11/2013 | Resch ............... H04L 67/1097 707/690 |
| 2014/0157405 A1* | 6/2014 | Joll ..................... H04L 63/1425 726/22 |
| 2014/0164774 A1* | 6/2014 | Nord ..................... G06F 21/602 713/171 |
| 2014/0229729 A1* | 8/2014 | Roth ................... H04L 63/0471 713/153 |
| 2014/0281517 A1* | 9/2014 | Erofeev .............. G06F 21/6218 713/165 |
| 2014/0281550 A1* | 9/2014 | Resch ................... H04L 9/0822 713/171 |
| 2015/0006890 A1* | 1/2015 | Roth .................... G06F 21/6254 713/165 |
| 2015/0067330 A1* | 3/2015 | Khan ................... H04L 9/3013 713/168 |
| 2015/0082399 A1* | 3/2015 | Wu ..................... G06F 21/6209 726/6 |
| 2015/0101024 A1* | 4/2015 | Leggette ............. H04L 67/1097 726/4 |
| 2015/0271150 A1* | 9/2015 | Barnett .................. G06F 16/23 713/171 |
| 2017/0041296 A1* | 2/2017 | Ford ..................... G06F 16/951 |
| 2017/0116433 A1* | 4/2017 | Erofeev .............. G06F 21/6218 |
| 2017/0126805 A1* | 5/2017 | Dhuse ................... G06F 3/0659 |
| 2017/0272252 A1* | 9/2017 | Leggette ............... H04L 9/3242 |
| 2018/0063090 A1* | 3/2018 | Resch ................. H04L 63/0428 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner distributed, or dispersed, storage network (DSN) 10

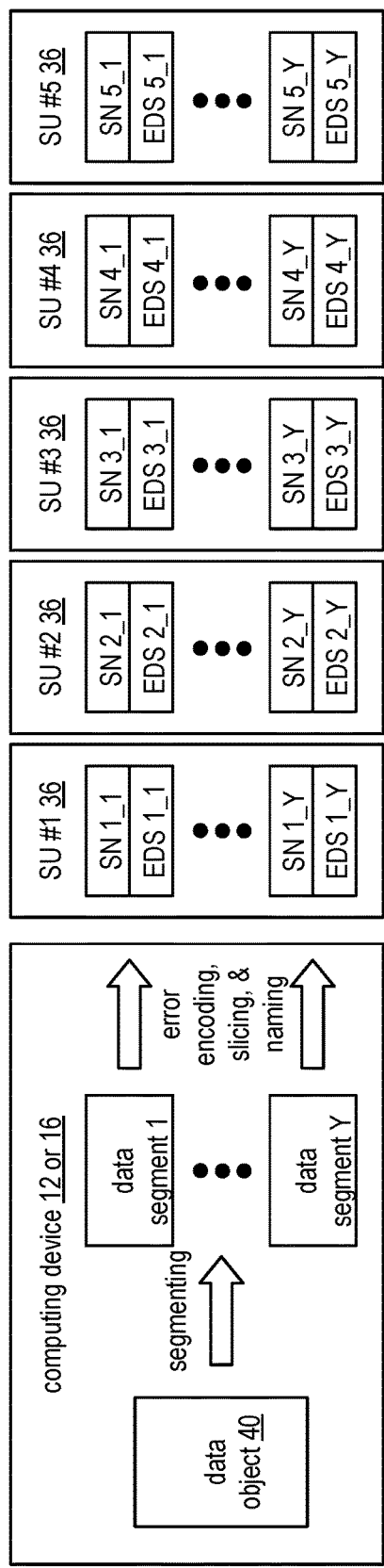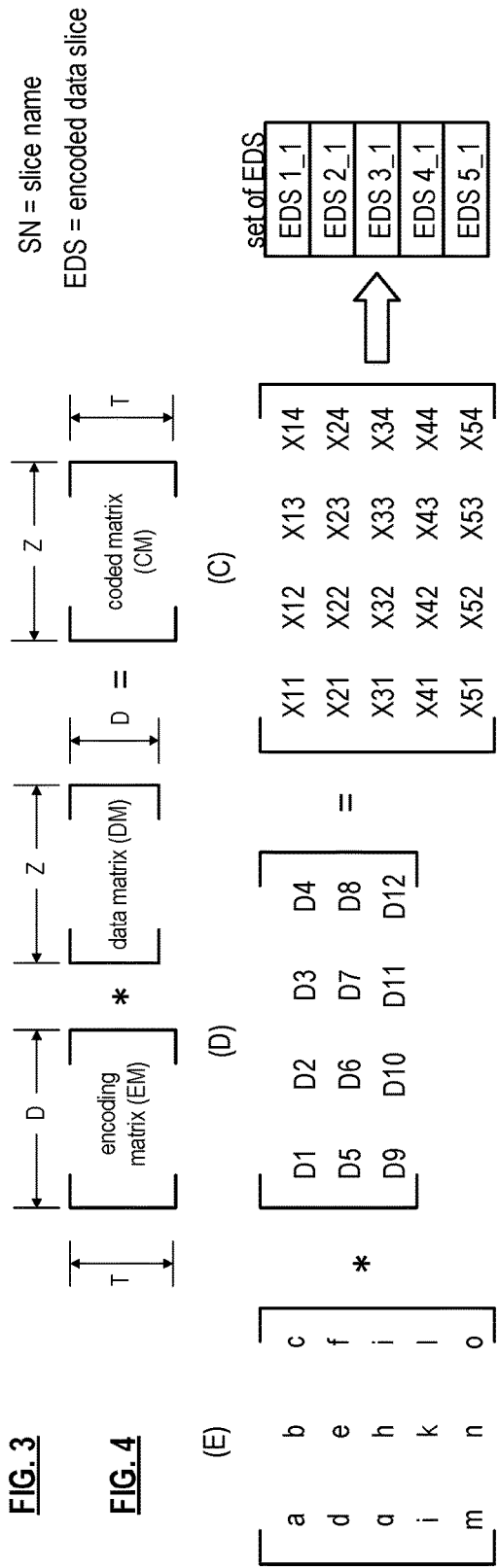

US 10,581,807 B2

USING DISPERSAL TECHNIQUES TO SECURELY STORE CRYPTOGRAPHIC RESOURCES AND RESPOND TO ATTACKS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Security of stored data can, in some cases, be of paramount importance. Unfortunately, even data stored using conventional encryption and "cloud storage" techniques can be vulnerable to an attacker who gains physical possession of the storage device on which the data is stored. This is particularly true if the secret information needed to decrypt the storage device is also located on the storage device.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
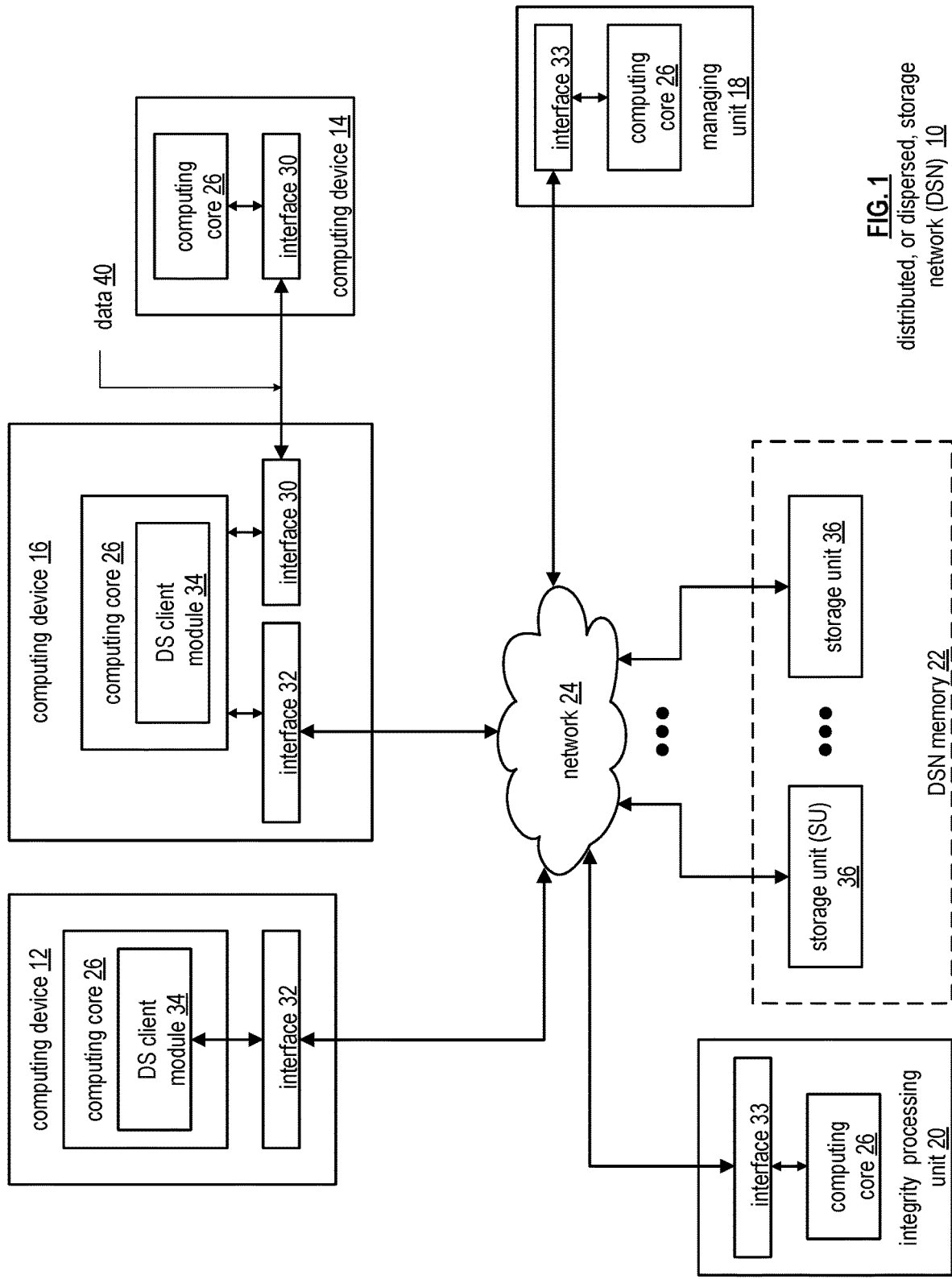
FIG. 1 is a schematic block diagram of an embodiment of a dispersed or distributed storage network (DSN) in accordance with the present invention.

In a dispersed storage network (DSN) memory, distributed storage (DS) units and DS processing units can use cryptographic keys or other secret material to identify themselves to one another via authentication protocols, or to perform encryption or signing on the data or slices they process. Successful authentication to other DS units, or successful decryption of data or slices, requires knowledge of this secret information. However, if all these cryptographic keys and other secret material are located within the DS unit or DS processing unit, then that unit becomes vulnerable to being physically attacked or stolen, and an attacker, in possession of a compromised DS unit or DS processing unit, could use the cryptographic material therein to access data or perform destructive actions.

To prevent such attacks, the DS units and DS processing units, rather than storing their secret material directly, instead store an encrypted form which is encrypted with a key, sometimes referred to herein as an "Unlock Key." The unlock key, and/or other unencrypted, or plaintext, cryptographic material, for the DS unit or DS processing units is not stored within the corresponding unit, but is stored externally. For example, the unlock key can be stored on a key management server (KMS), or stored in data slices encoded using a secure and reliable error correcting function, such as All-or-Nothing Transform, or Shamir Secret Sharing Scheme, with individual data slices dispersed across a set of DS units, such that no one DS unit has a threshold number required to recover the key material. The ability to recover the slices to get a threshold number to decode the Unlock Key, or to recover plaintext cryptographic material directly, requires the DS unit or DS processing unit to successfully authenticate itself with its authentication credentials.

When the DS unit has the unlock key and decrypted/decoded its cryptographic material, the unit is in a vulnerable state. However, the unit can transition into a secure mode by deleting/overwriting/erasing from memory its Unlock Key, the unencrypted cryptographic/secret material, and the authentication keys. Without these, an attacker who fully compromises a DS unit or DS processing unit cannot use anything within the unit to recover user data.

A DS unit may enter secure mode under various circumstances. For example, the DS unit can enter a secure mode when it is notified to do by an external unit, or when the DS unit itself detects that it is currently under attack or about to be compromised. A transition to a secure mode can also be initiated if the DS unit determines that it is vulnerable to at least one exploit, for which a fix is not currently available, if the DS unit determines that it is about to be removed or detects physical tampering, for example removal of screws or ace plates, opening of a rack or cage door, or activation of a physical alarm, due to unauthorized entry into a secure data center or room.

To recover a DS unit after entering secure mode, the DS unit's authentication credentials must be reissued/replaced. When the authentication credentials have been replaced, the DS unit or DS processing unit can restore a threshold number of slices to recover its Unlock Key or other cryptographic material, and resume operation.

Refer now to FIG. 1, which is a schematic block diagram of an embodiment of a dispersed, or distributed storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
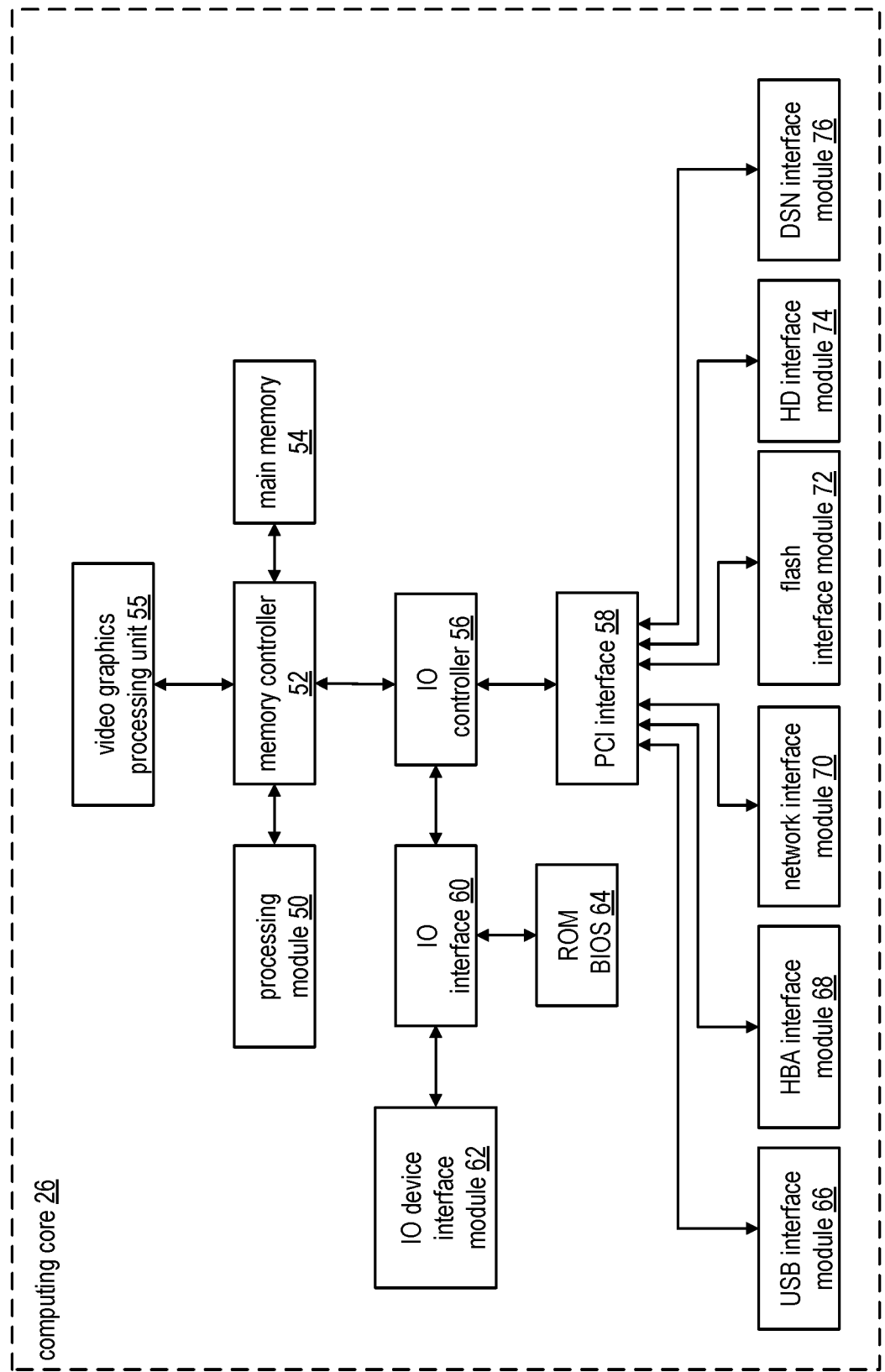
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
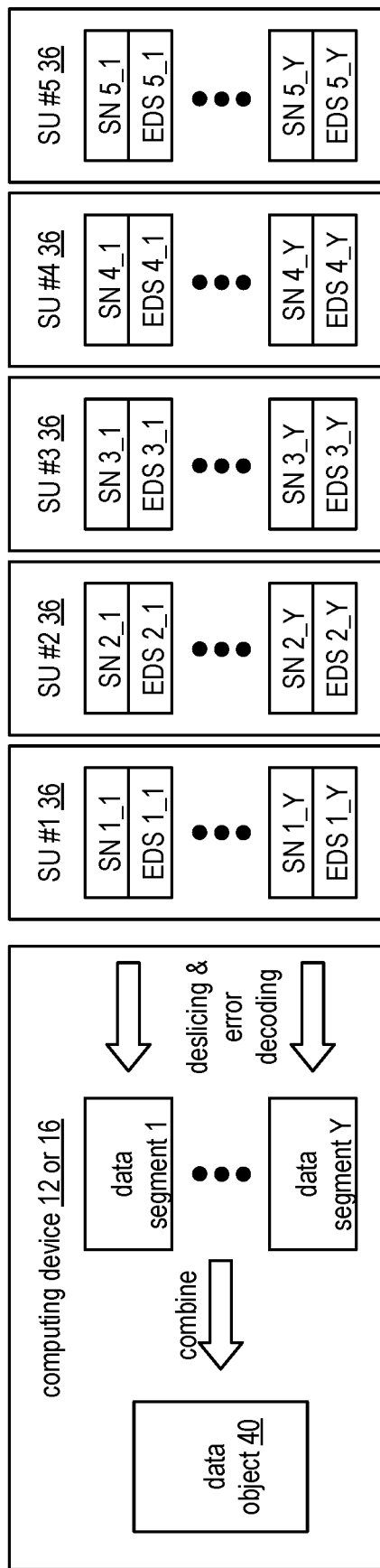
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
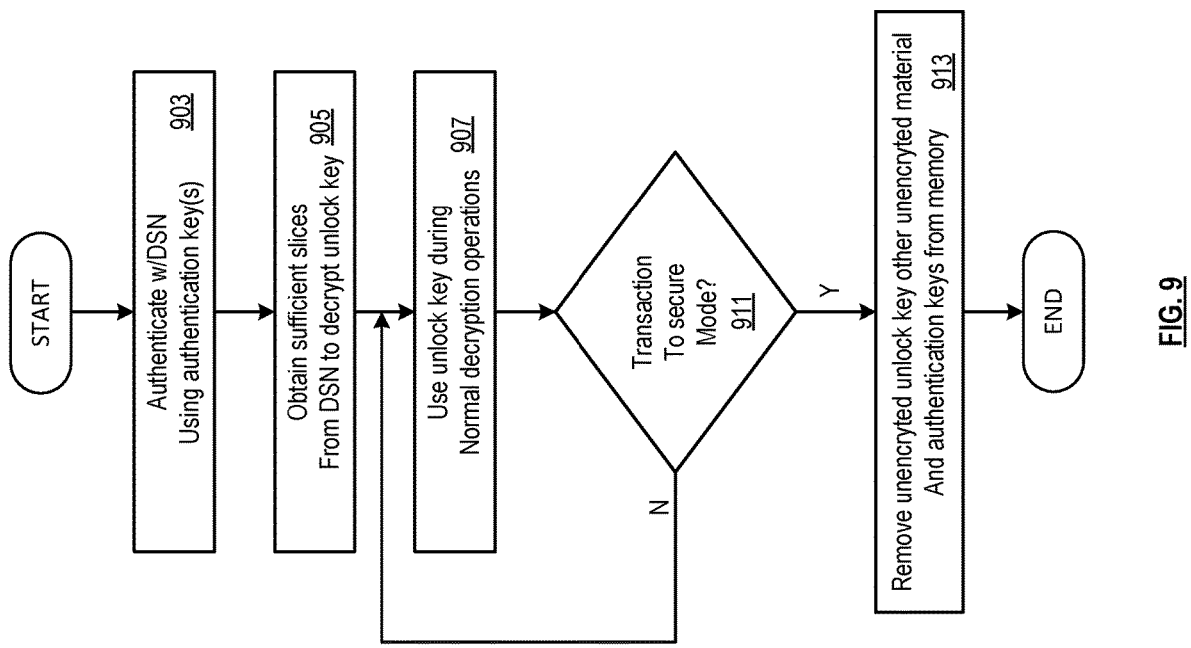
FIG. 9 is a logic diagram of an example of a method of a distributed storage (DS) unit responding to potential attacks by entering a secure mode, in accordance with the present invention.

FIG. 9 is a logic diagram of an example of a method of storage unit, such as storage unit 36 (FIG. 1), responding to potential attacks by entering a secure mode, in accordance with various embodiments of the present invention.

As illustrated by block 903, during a normal mode of operation, a DS unit, for example, storage unit 36, passes its authentication credentials to an external device, for example, managing unit 18, DSN memory 22, another storage unit, or the like. The external device authenticates the DS unit, and allows the DS unit to receive an unlock key, as illustrated by block 905. The unlock key can be used to perform decryption operations related to storage, retrieval, and reassembly of encrypted data slices.

In various embodiments, the unlock key is stored at a key management server (KMS), and can be received at the DS unit from the KMS as an encrypted message. In some embodiments, a managing unit that is part of the DSN can authenticate the DS unit, and instruct the KMS to transmit the unlock key to the DS unit. In other embodiments, the DS unit can authenticate directly with the KMS. In still other embodiments, a managing unit or DSN memory can authenticate the DS unit, and instruct other DS units to provide encoded data slices to the authenticated DS unit. After the DS unit has received the threshold number of encoded data slices needed to reconstruct the unlock key, the DS unit can decrypt, or otherwise recover, the unlock key, and begin using the unlock key in normal operations, as illustrated by block 907.

As illustrated by block 911, a check can be made to determine whether a security event has occurred, requiring the DS unit to transition to a secure mode. The check can be made periodically, or can be initiated in response to a software or hardware interrupt. The security event can be, for example, an interrupt generated in response to, a message from an external device such as a managing unit, the DSN memory to which the DS unit belongs, another DS unit or DSN memory. A security event can also include receiving information in response to polling anti-tampering circuitry, receiving an interrupt signal generated in response to a facility alarm, activation of an anti-tampering switch or other device that detects attempted physical removal of the DS unit, receiving an indication that a software or hardware exploit has been discovered, and for which no fix is currently available, or the like.

If it is determined at block 911 that a security event has occurred, and that the security event requires the DS unit to enter a secure mode, unencrypted secret material and/or various encryption keys can be erased from memory in the DS unit, as illustrated by block 913. In at least one embodiment, entry into the secure mode includes erasure of the DS unit's authentication keys, the unlock key, and any material that has been decrypted using the unlock key. Erasing the unlock key prevents the DS unit from being able to decrypt any encrypted information stored on the DS unit. Erasing the authentication key prevents the DS unit from establishing its identity with the DSN, and therefore prevents the DS unit from being able to obtain the unlock key.

The unencrypted material, unlock key, and authentication key can be erased using any of various techniques known to those of ordinary skill in the art. In some embodiments, a basic erasure technique that can be implemented quickly is used first, and then if time permits a more thorough erasure procedure can be performed. Note that in at least one embodiment, the encrypted data on the DS unit does not need to be erased along with the unlock key and the authentication key, because the data is stored in encrypted slices, and there are not enough slices of the data stored on the DS unit to allow reconstruction of the encrypted data even if the unlock key were available.

Figure 10:
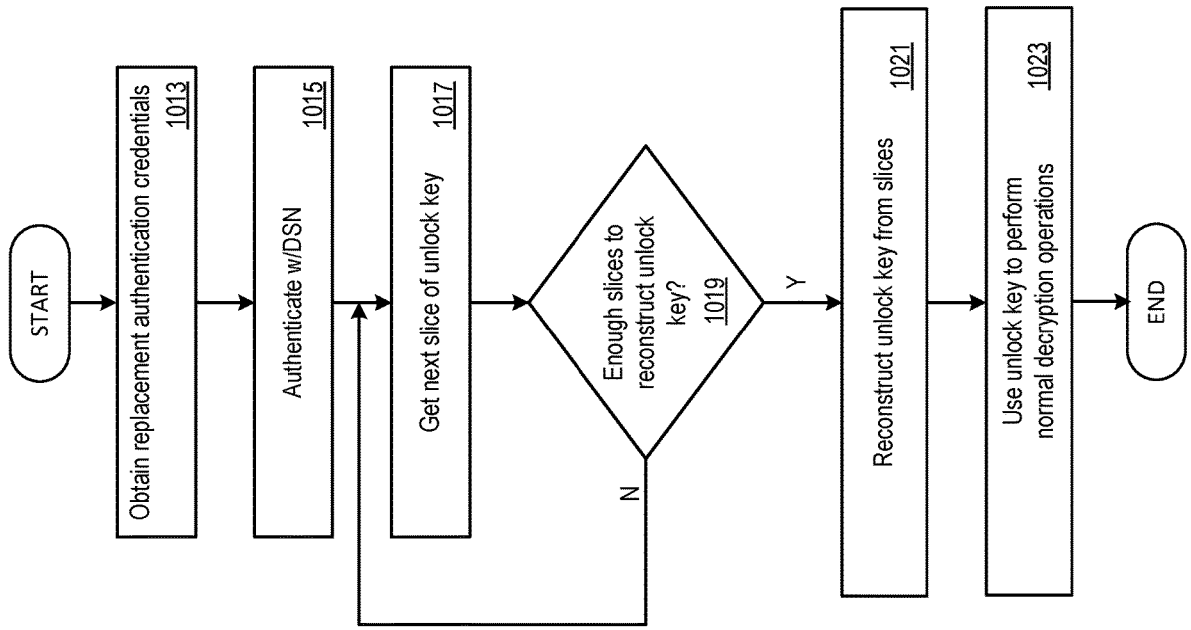
FIG. 10 is a logic diagram of an example of a method of restoring operation of a DS unit after entry into a secure mode, in accordance with the present invention.

FIG. 10 is a logic diagram of an example of a method of restoring operation of a DS unit after entry into a secure mode, in accordance with various embodiments of the present invention. As discussed with respect to FIG. 9, in at least one embodiment the encrypted data slices stored on the DS unit do not need to be erased during transition to a secure mode. Thus, it can be desirable to recover the DS unit from secure mode. To recover the DS unit from secure mode and return it to a normal mode of operation, replacement authentication credentials are obtained, as illustrated at block 1013. These new credentials can be different from the original authentication credentials, or they can be the same credentials. Once the new credentials are provided to the DS unit, as illustrated at block 1013, the DS unit can authenticate with, and rejoin, the DSN, as shown by block 1015. Once authenticated, the DS unit can request the unlock key from a managing unit, a DSN memory, or request data slices from other DS units, as illustrated at block 1017.

As illustrated at block 1019, a check is made to determine if the DS unit has received enough slices to reconstruct the unlock key. In some embodiments, for example when the entire unlock key is provided by a key management server (KMS), the check at block 1019 will return a YES result upon receipt of the message including the unlock key. In other embodiments, the DS unit continues to receiver slices of the unlock key at block 1017 until a threshold number of encoded data slices has been received. In some embodiments one or more encoded data slices that can be used to reconstruct the unlock key, but less than the threshold number, can be stored locally on the DS unit.

As illustrated by block 1021, once the threshold number of encoded data slices have been received, the DS unit can reconstruct the unlock key. As illustrated at block 1023, the DS unit can use the unlock key to perform normal decryption operations.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

The invention claimed is:

1. A method for use in a dispersed storage network (DSN) including a DSN memory employing a plurality of distributed storage (DS) units, the method comprising:
at the DS unit:
storing encrypted secret material at a DS unit, wherein the encrypted secret material can be decrypted only using an unlock key, and wherein the DS unit is authorized to receive the unlock key only after the DS unit has been authenticated using authentication credentials stored in the DS unit;
transmitting the authentication credentials stored in the DS unit from the DS unit to at least one other device included in the DSN, external to the DS unit;
at the at least one other device:
authenticating the DS unit based on the authentication credentials;
instructing the other DS units to transmit encoded data slices of the unlock key to the DS unit;
at the DS unit:
receiving, from the other DS units, encoded data slices of the unlock key;
reconstructing the unlock key from the encoded data slices of the unlock key received from the other DS units;
in response to a security event, transitioning the DS unit into a secure mode,
wherein transitioning the DS unit into the secure mode includes:
erasing from the DS unit the encrypted secret material that has been decrypted using the unlock key;
erasing from the DS unit the unlock key; and
erasing from the DS unit the authentication credentials.

2. The method of claim 1, wherein:
fewer than a read threshold number of encoded data slices of the unlock key are stored at the DS unit.

3. The method of claim 1, wherein the security event includes:
receiving, at the DS unit, a security notification from a DS managing unit.

4. The method of claim 1, wherein the security event includes:
determining that the DS unit is vulnerable to at least one exploit for which a fix is unavailable.

5. The method of claim 1, wherein the security event includes:
detection of physical tampering.

6. The method of claim 1, further comprising:
recovering the DS unit to a functional state after the DS unit has transitioned to the secure mode, wherein recovering the DS unit to the functional state includes receiving reissued authentication credentials from a DS managing unit.

7. A processing system configured to implement a distributed storage (DS) unit, the DS unit comprising:
a computing core;
a memory coupled to the computing core;
a network interface configured to couple the DS unit to a dispersed storage network (DSN) including one or more DSN memory devices employing a plurality of DS units;
the computing core configured to:
store, in the memory, encrypted secret material wherein the encrypted secret material can be decrypted using an unlock key, and wherein the DS unit is authorized to receive the unlock key only after the DS unit has been authenticated using authentication credentials stored in the DS unit;
store, in the memory, authentication credentials used to obtain the unlock key;
authenticate with an external device included in the DSN, the external device configured to instruct one or more other external devices included in the DSN to transmit an encrypted version of the unlock key to the DS unit;
decrypt and store in the memory, at least temporarily, the unlock key; and
transition the DS unit into a secure mode in response to a security event, by erasing the unlock key and the authentication credentials from the memory, while leaving the encrypted secret material stored in the DS unit.

8. The processing system of claim 7, wherein:
the unlock key is stored using a plurality of data slices dispersed throughout the DSN using a dispersed encoding technique; and wherein
the computing core is further configured to obtain at least one of the plurality of data slices from a plurality of external devices, until at least a threshold number of data slices needed to reconstruct the unlock key have been obtained.

9. The processing system of claim 7, wherein the computing core is further configured to transition the DS unit into the secure mode by:
erasing from the memory the encrypted secret material that has been decrypted using the unlock key.

10. The processing system of claim 7, wherein the security event includes at least one of:
receiving, via the network interface, a security notification indicating that the DS unit should transition to the secure mode; or
detection of physical tampering.

11. The processing system of claim 7, wherein the computing core is further configured to:
recover the DS unit to a functional state after the DS unit has transitioned to the secure mode, wherein recovering the DS unit to the functional state includes receiving reissued authentication credentials from a DS managing unit.

12. A dispersed storage network (DSN) comprising:
a DSN memory including distributed storage (DS) units;
at least one processing core implementing a managing unit configured to manage authentication of DS units within the DSN, wherein the at least one processing core is included in a device that is physically separate from the DS units;
at least one DS unit-including:
a computing core;
a memory coupled to the computing core;
a network interface configured to couple the at least one DS unit to the DSN;
the computing core configured to:
store, in the memory, authentication credentials used to obtain an unlock key needed to decrypt secret material stored in the at least one DS unit;
transmit the authentication credentials to the managing unit;
the at least one processing core implementing the managing unit configured to:
authenticate the at least one DS unit based on the authentication credentials;
instruct other DS units included in the DSN memory to transmit encoded data slices of the unlock key to the DS unit;
the computing core included in the at least one DS unit further configured to:
receive, from the other DS units, encoded data slices of the unlock key;
reconstruct the unlock key from the encoded data slices of the unlock key received from the other DS units; and
erase the authentication credentials from the memory in response to a security event.

13. The dispersed storage network of claim 12, wherein the computing core is further configured to:
store the unlock key in the memory, at least temporarily; and
erase the unlock key and the authentication credentials in response to the security event.

14. The dispersed storage network of claim 12, wherein the security event includes at least one of:
receiving, via the network interface, a security notification indicating that the DS unit should transition to a secure mode; or
detection of physical tampering.

15. The dispersed storage network of claim 12, wherein the computing core is further configured to:
recover the DS unit to a functional state in response to receiving reissued authentication credentials from the managing unit, wherein recovering the DS unit to the functional state includes:
receiving, from the other DS units, additional encoded data slices of the unlock key; and
reconstructing the unlock key from the additional encoded data slices of the unlock key received from the other DS units.

* * * * *